US011799597B2

(12) United States Patent
Fujishiro

(10) Patent No.: US 11,799,597 B2
(45) Date of Patent: Oct. 24, 2023

(54) METHOD AND APPARATUS FOR PACKET DUPLICATION AND RETRANSMISSION

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 293 days.

(21) Appl. No.: 17/237,148

(22) Filed: Apr. 22, 2021

(65) Prior Publication Data

US 2021/0242974 A1 Aug. 5, 2021

Related U.S. Application Data

(63) Continuation of application No. PCT/JP2019/040466, filed on Oct. 15, 2019.

(30) Foreign Application Priority Data

Oct. 30, 2018 (JP) .................................. 2018-204504

(51) Int. Cl.
*H04L 1/18* (2023.01)
*H04L 1/1867* (2023.01)
*H04W 80/02* (2009.01)

(52) U.S. Cl.
CPC ............ *H04L 1/189* (2013.01); *H04L 1/1896* (2013.01); *H04W 80/02* (2013.01)

(58) Field of Classification Search
CPC ...... H04L 1/189; H04L 1/1896; H04W 80/02; H04W 28/04; H04W 72/04
See application file for complete search history.

(56) References Cited

U.S. PATENT DOCUMENTS

| 2012/0057560 | A1 | 3/2012 | Park et al. |
| 2017/0005758 | A1 | 1/2017 | Baldemair et al. |
| 2018/0098250 | A1 | 4/2018 | Vrzic et al. |
| 2018/0279168 | A1* | 9/2018 | Jheng ..................... H04L 5/001 |
| 2018/0279169 | A1 | 9/2018 | Wang et al. |
| 2020/0120569 | A1* | 4/2020 | Baek ..................... H04W 12/04 |
| 2020/0177316 | A1* | 6/2020 | Tang .................... H04L 1/1816 |
| 2022/0377602 | A1* | 11/2022 | Kim ......................... H04L 9/40 |

FOREIGN PATENT DOCUMENTS

JP 2017-509177 A 3/2017

OTHER PUBLICATIONS

3rd Generation Partnership Project; Technical Specification Group Radio Access Network; NR; NR and NG-RAN Overall Description; Stage 2 (Release 15) 3GPP TS 38.300 V15.3.0, Sep. 2018; pp. 1-92; 3GPP Organizational Partners.
R2-1806681 "Left issues on Data Recovery for PDCP Duplication (for NR)"; 3GPP TSG-RAN2 Meeting #102; Busan, Korea, May 21-May 25, 2018.

* cited by examiner

*Primary Examiner* — Afshawn M Towfighi
(74) *Attorney, Agent, or Firm* — Studebaker & Brackett PC

(57) ABSTRACT

A radio communication method is used in a mobile communication system, the method includes: generating, by a PDCP entity corresponding to a PDCP layer, a packet; transmitting, by a first transmission entity, the packet; and based on unsuccessful transmission of the packet by the first transmission entity, performing duplicate transmission of the packet, including: retransmitting, by the first transmission entity, the packet and transmitting, by a second transmission entity different from the first transmission entity, the packet. Each of the first transmission entity and the second transmission entity corresponds to a layer lower than the PDCP layer.

15 Claims, 8 Drawing Sheets

METHOD AND APPARATUS FOR PACKET DUPLICATION AND RETRANSMISSION

RELATED APPLICATIONS

The present application is a continuation based on PCT Application No. PCT/JP2019/040466, filed on Oct. 15, 2019, which claims the benefit of JP Patent Application No. 2018-204504 filed on Oct. 30, 2018. The content of which is incorporated by reference herein in their entirety.

TECHNICAL FIELD

The present invention relates to a radio communication method and an apparatus used in a mobile communication system.

BACKGROUND ART

Duplicate transmission (packet duplication), in which same packet are transmitted in duplicate, has been introduced in mobile communication systems based on the 3GPP (3rd Generation Partnership Project) standard as one of the functions to support ultra-reliable and low-latency communication (URLLC) service.

CITATION LIST

Non-Patent Literature

Non-Patent Literature 1: 3GPP Technical Specification "TS38.300 V15.3.0" September 2018, Internet <URL: http://www.3gpp.org/ftp//Specs/archive/38_series/38.300/38300430.zip>

SUMMARY

A radio communication method according to a first embodiment is used in a mobile communication system, the method includes: generating, by a PDCP entity corresponding to a PDCP layer, a packet; transmitting, by a first transmission entity, the packet; and based on unsuccessful transmission of the packet by the first transmission entity, performing duplicate transmission of the packet, including: retransmitting, by the first transmission entity, the packet and transmitting, by a second transmission entity different from the first transmission entity, the packet. Each of the first transmission entity and the second transmission entity corresponds to a layer lower than the PDCP layer.

An apparatus according to a second embodiment is an apparatus used in a mobile communication system, the apparatus includes: a PDCP entity corresponding to a PDCP layer and configured to generate a packet; a first transmission entity configured to transmit the packet; and a second transmission entity different from the first transmission entity. The first transmission entity and the second transmission entity corresponds to a layer lower than the PDCP layer. Based on unsuccessful transmission of the packet by the first transmission entity, the first transmission entity retransmits the packet and the second transmission entity transmits the packet to perform duplicate transmission of the same packet by the first transmission entity and the second transmission entity.

DESCRIPTION OF EMBODIMENTS

Figure 1:
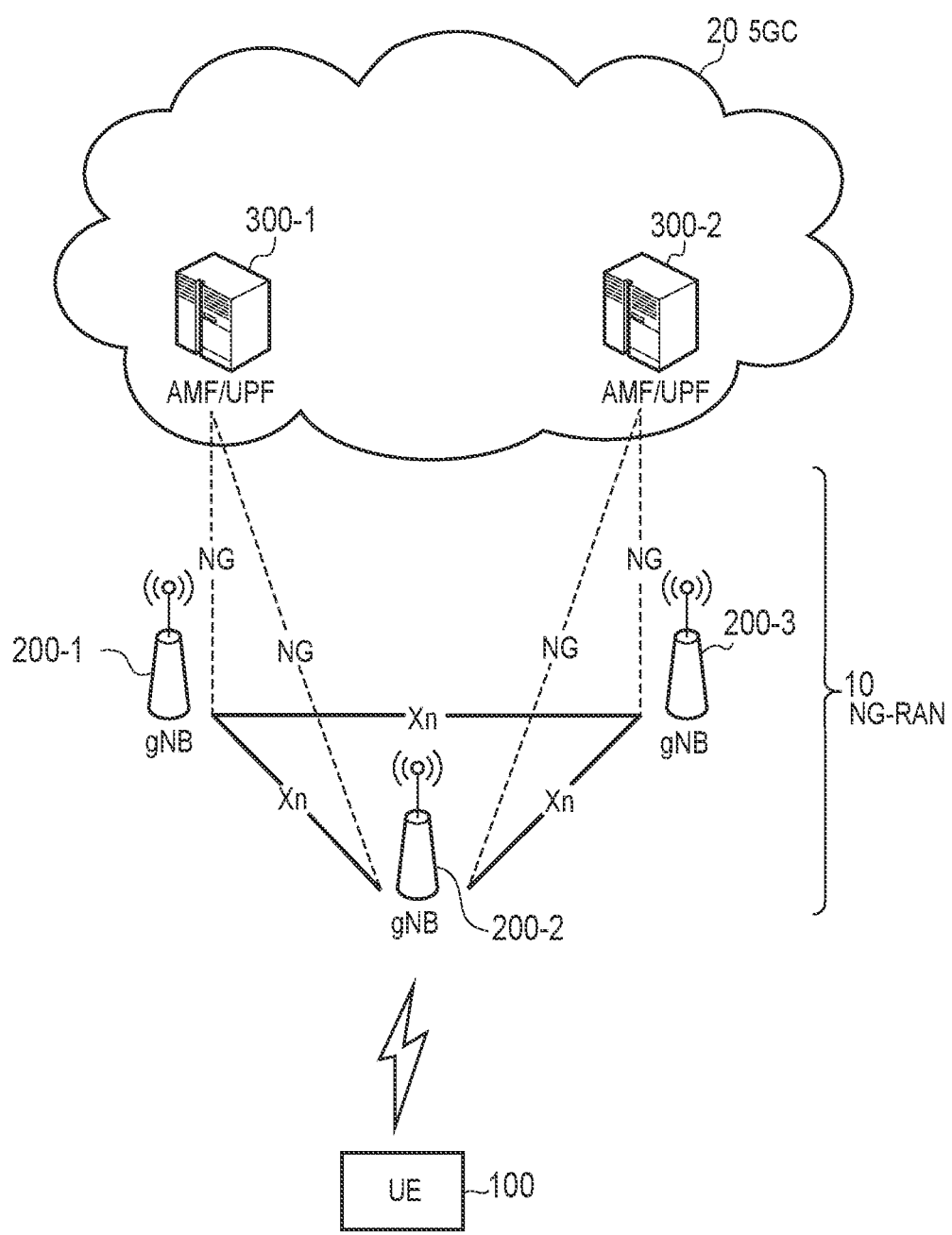
FIG. 1 is a diagram illustrating a configuration of a mobile communication system according to an embodiment.

Although being capable of improving the reliability of communication, the duplicate transmission uses twice the amount of radio resources for transmission compared with when the duplicate transmission is not employed, and is thus susceptible to improvement in view of enhancing the use efficiency of radio resources.

Therefore, the present disclosure improves the use efficiency of radio resources while improving the reliability of communication.

A mobile communication system according to one embodiment will be described with reference to the accompanying drawings. Note that in the descriptions of the drawing below, identical or similar symbols are assigned to identical or similar portions.

(A Configuration of a Mobile Communication System)

A configuration of a mobile communication system according to an embodiment will be described. FIG. 1 is a diagram illustrating a configuration of a mobile communication system 1 according to an embodiment. The mobile communication system 1 complies with a 5G mobile communication system based on 3GPP standard. In the following, a 5G system will be described as an example. However, LTE (Long Term Evolution) may be applied to the mobile communication system 1 at least partially.

As shown in FIG. 1, the mobile communication system 1 comprises a user equipment (UE) 100, a 5G radio access network (NG-RAN: Next Generation Radio Access Network) 10, and a 5GC (5G Core Network) 20.

The UE 100 is a mobile radio communication device. The UE 100 may be any device as long as it is a device that is used by a user. For example, the UE 100 is a mobile phone terminal (including a smart phone), a tablet terminal, a notebook PC, a sensor, a device installed in the sensor, a vehicle, a device installed in vehicle (Vehicle UE) or air vehicle or a device installed in air vehicle (Aerial UE).

An NG-RAN 10 includes a base station (referred to as a "gNB" in 5G systems) 200. The gNBs 200 are connected to each other via an Xn interface, which is an inter-base station interface. The gNB 200 manages one or a plurality of cells. The gNB 200 performs radio communication with the UE 100 which sets up the connection with a cell of the gNB 200. The gNB 200 has a radio resource management (RRM)

function, a routing function of user data (hereinafter, simply referred to as "data"), a measurement control function for mobility control and scheduling, and the like. The "cell" is used as a term indicating a smallest unit of a radio communication area. The "cell" may also be used as a term indicating a function of performing the radio communication with the UE 100 or a resource. One cell belongs to one carrier frequency.

The gNB can be connected to an evolved packet core (EPC), which is a core network of LTE. An LTE base station can be connected to 5GC. The LTE base station and the gNB can be connected to each other via an inter-base station interface.

The 5GC 20 includes an access and mobility management function (AMF) and a user plane function (UPF) 300. The AMF performs various mobility controls and the like on the UE 100. The AMF manages information on a tracking area (TA) in which the UE 100 exists by communicating with the UE 100 using non-access stratum (NAS) signaling. The tracking area is an area composed of a plurality of cells. The UPF performs data transfer control. The AMF and the UPF are connected to the gNB 200 via an NG interface, which is a base station-core network interface.

Figure 2:
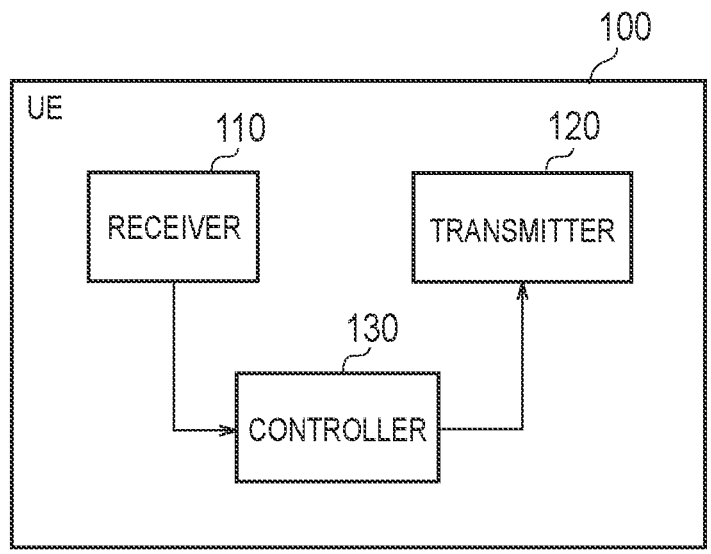
FIG. 2 is a diagram illustrating a configuration of a user equipment according to the embodiment.

FIG. 2 is a diagram illustrating a configuration of the UE 100.

As shown in FIG. 2, the UE 100 comprises a receiver 110, a transmitter 120 and a controller 130.

The receiver 110 performs various receptions under the control of the controller 120. The receiver 110 includes an antenna and a receiver. The receiver converts a radio signal received by the antenna into a baseband signal (received signal) and outputs the baseband signal to the controller 130.

The transmitter 120 performs a variety of transmission under the control of the controller 130. The transmitter 120 includes an antenna and a transmitter. The transmitter converts the baseband signal (transmitted signal) output from the controller 130 into the radio signal and transmits the radio signal from the antenna.

The controller 130 performs various controls in the UE 100. The controller 130 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory.

Figure 3:
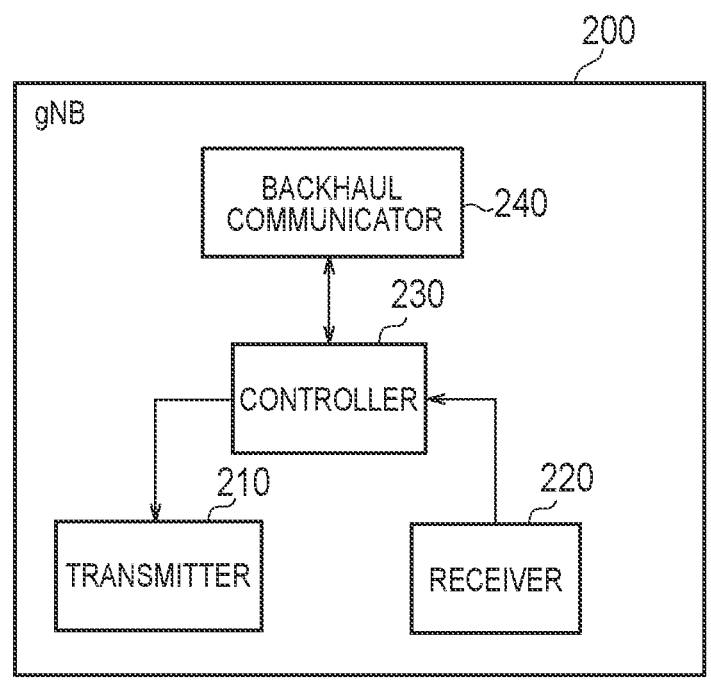
FIG. 3 is a diagram illustrating a configuration of a base station according to the embodiment.

FIG. 3 is a diagram illustrating a configuration of the gNB 200 (base station).

As shown in FIG. 3, the gNB 200 comprises a transmitter 210, a receiver 220, a controller 230, and a backhaul communicator 240.

The transmitter 210 performs a variety of transmission under the control of the controller 230. The transmitter 210 includes an antenna and a transmitter. The transmitter converts the baseband signal (transmitted signal) output from the controller 230 into the radio signal and transmits the radio signal from the antenna.

The receiver 220 performs various receptions under the control of the controller 230. The receiver 220 includes an antenna and a receiver. The receiver converts a radio signal received by the antenna into a baseband signal (received signal) and outputs the baseband signal to the controller 230.

The controller 230 performs various controls in the gNB 200. The controller 230 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory.

The backhaul communicator 240 is connected to an adjacent base station via an inter-base station interface. The backhaul communicator 240 is connected to the AMF/UPF 300 via a base station-core network interface. The gNB is composed of a central unit (CU) and a distributed unit (DU) (that is, the functions are divided), and these units may be connected via an F1 interface.

Figure 4:
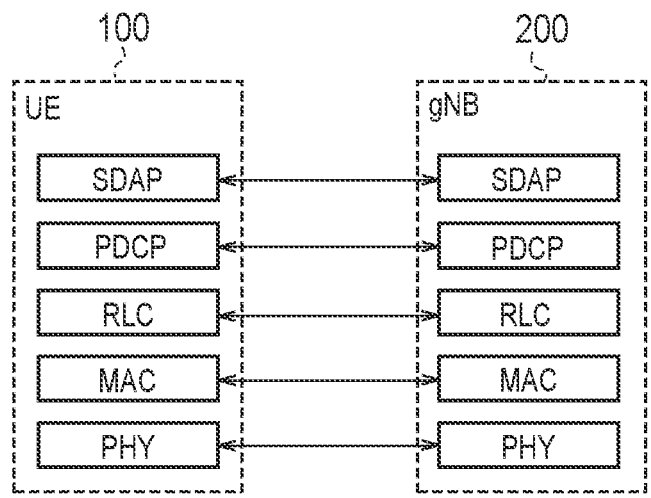
FIG. 4 is a diagram illustrating a protocol stack configuration of a radio interface of a user plane according to the embodiment.

FIG. 4 is a diagram illustrating a protocol stack configuration of a radio interface of a user plane which treats data.

As shown in FIG. 4, the radio interface protocol stack of the user plane has PHY (physical) layer, MAC (Medium Access Control) layer, RLC (Radio Link Control) layer, PDCP (Packet Data Convergence Protocol) layer, and SDAP (Service Data Adaptation Protocol) layer.

The PHY layer performs encoding, decoding, modulation, demodulation, antenna mapping, antenna demapping, resource mapping and resource demapping. Data and control information are transmitted between the PHY layer of the UE 100 and the PHY layer of the gNB 200 via a physical channel.

The MAC layer performs data prioritization control, a retransmission process according to hybrid ARQ (HARD), and a random access procedure. Data and control information are transmitted between the MAC layer of the UE 100 and the MAC layer of the gNB 200 via a transport channel. The MAC layer of the gNB 200 includes a scheduler. The scheduler determines a transport format (a transport block size and a modulating/encoding method (MCS)) in uplink and downlink, and allocated resource blocks for the UE 100.

The RLC layer transmits data to the RLC layer at a reception side by using functions of the MAC layer and the PHY layer. Data and control information are transmitted between the RLC layer of the UE 100 and the RLC layer of the gNB 200 via a logical channel.

The PDCP layer performs header compression, header extension, encryption and decoding.

The SDAP layer performs mapping between an IP flow, which is a unit of QoS control by a core network, and a radio bearer, which is a unit of QoS control by an access stratum (AS). When the RAN is connected to an EPC, the SDAP may be omitted.

Figure 5:
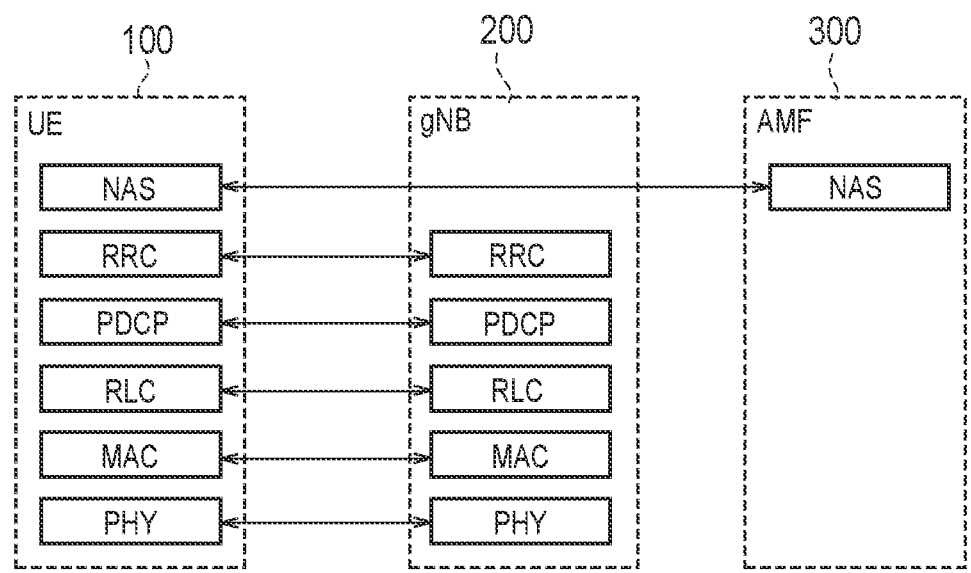
FIG. 5 is a diagram illustrating a protocol stack configuration of a radio interface of a control plane according to the embodiment.

FIG. 5 is a diagram illustrating a configuration of a protocol stack of a radio interface in a control plane for handling signaling (control signals).

As illustrated in FIG. 5, the protocol stack of the radio interface in the control plane has a radio resource control (RRC) layer and a non-access stratum (NAS) layer instead of the SDAP layer illustrated in FIG. 4.

The RRC layer is defined only in a control plane which handles a control signal. Signaling (RRC signaling) for various configurations is transmitted between the RRC layer of the UE 100 and the RRC layer of the gNB 200. The RRC layer controls a logical channel, a transport channel and a physical channel in response to establishment, reestablishment and release of a radio bearer. When the RRC of the UE 100 and the RRC of the gNB 200 are connected (RRC connection), the UE 100 is in a RRC connected mode and, when this is not a case, the UE 100 is in a RRC idle mode.

An NAS layer located above the RRC layer performs session management, mobility management, and the like.

NAS signaling is transmitted between the NAS layer of the UE 100 and the NAS layer of the AMF 300.

Note that the UE 100 has an application layer and the like outside of the protocol of the radio interface.

(Operation of Mobile Communication System)

Next, operation of a mobile communication system according to an embodiment will be described.

(1) Overview of Packet Duplication

An overview of packet duplication (hereinafter, referred to as duplicate transmission) will be described. In the following, an example in which the same PDCP packets are transmitted in duplicate with two independent transmission paths is mainly described. The duplicate transmission may be a transmission of the same PDCP packets in triplicate or more with three or more independent transmission paths.

Figure 6:
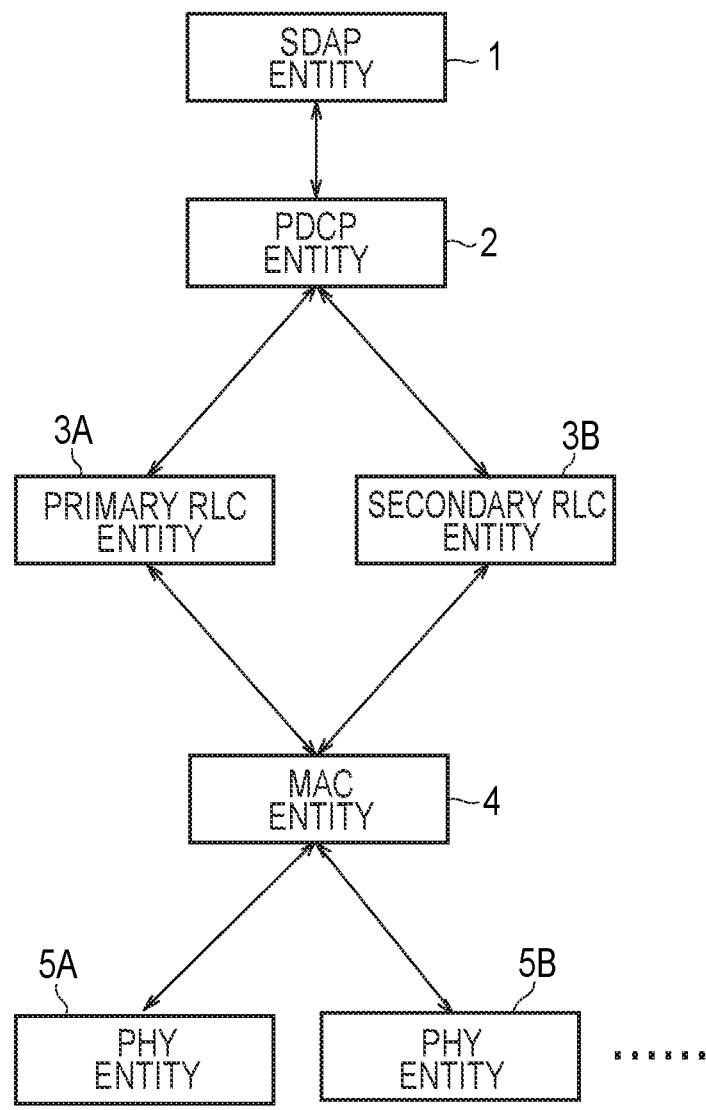
FIG. 6 is a diagram illustrating a first exemplary configuration of duplicate transmission according to an embodiment.

FIG. 6 is a diagram illustrating a first exemplary configuration of duplicate transmission.

As illustrated in FIG. 6, the UE 100 and the gNB 200 each have an SDAP entity 1 corresponding to the SDAP layer, a PDCP entity 2 corresponding to the PDCP layer, a primary RLC entity 3A and a secondary RLC entity 3B corresponding to the RLC layer, a MAC entity 4 corresponding to the MAC layer, and a plurality of PHY entities 5A, 5B, . . . corresponding to the PHY layer. The plurality of PHY entities 5A, 5B, . . . are provided so as to correspond to a plurality of carriers (a plurality of cells) for carrier aggregation.

Here, the primary RLC entity 3A is an example of a first transmission entity, and the secondary RLC entity 3B is an example of a second transmission entity. The first and second transmission entities are entities that correspond to a layer lower than the PDCP layer.

For the transmission in triplicate or more, two or more secondary RLC entities 3B (second transmission entities) may exist. In such a case, the first transmission entity may be one of the plurality of secondary RLC entities, and the second transmission entity may be another secondary RLC entity.

When these entities are provided in the UE 100 (that is, duplicate transmission in the uplink), the function of each entity may be achieved by the processor of the UE 100. The PDCP entity 2, the primary RLC entity 3A, and the secondary RLC entity 3B are provided in the UE 100.

On the other hand, when these entities are provided in the gNB 200 (that is, duplicate transmission in the downlink), the function of each entity may be achieved by the processor of the gNB 200. The PDCP entity 2, the primary RLC entity 3A, and the secondary RLC entity 3B are provided in the gNB 200.

When an RRC entity (not illustrated) of the gNB 200 configures duplicate transmission for a radio bearer, the secondary RLC entity 3B and a secondary logical channel are added to the radio bearer to process the PDCP packet (PDCP PDU: PDCP Protocol Data Unit) to be transmitted in duplicate.

In the duplicate transmission, the primary RLC entity 3A and the secondary RLC entity 3B each transmit the same PDCP PDU. The duplicate transmission improves reliability and reduces latency through two independent transmission paths. The PDCP control PDU may always be transmitted by the primary RLC entity 3A instead of being transmitted in duplicate.

When the duplicate transmission is activated, the original PDCP PDU and the corresponding duplicate transmission data shall not be transmitted on the same carrier (same cell). To ensure that a logical channel carrying the original PDCP PDU and a logical channel carrying the corresponding duplicate transmission data are not transmitted on the same carrier (same cell), mapping restriction on logical channels is employed in the MAC entity 4.

When one RLC entity 3 confirms the delivery of the PDCP PDU, the PDCP entity 2 instructs the other RLC entity 3 to discard the PDCP PDU. When the number of retransmissions of the PDCP PDU by the secondary RLC entity 3B reaches the maximum, the UE 100 notifies the gNB 200 of this, but radio link failure (RLF) is not triggered.

When configuring the duplicate transmission for a data radio bearer (DRB), the RRC entity also configures an initial state (either active or inactive). After configuration, the state (either active or inactive) can be dynamically controlled with a MAC control element transmitted from the gNB 200 to the UE 100. When the duplicate transmission is configured for a signaling radio bearer (SRB), the state may always be active.

Figure 7:
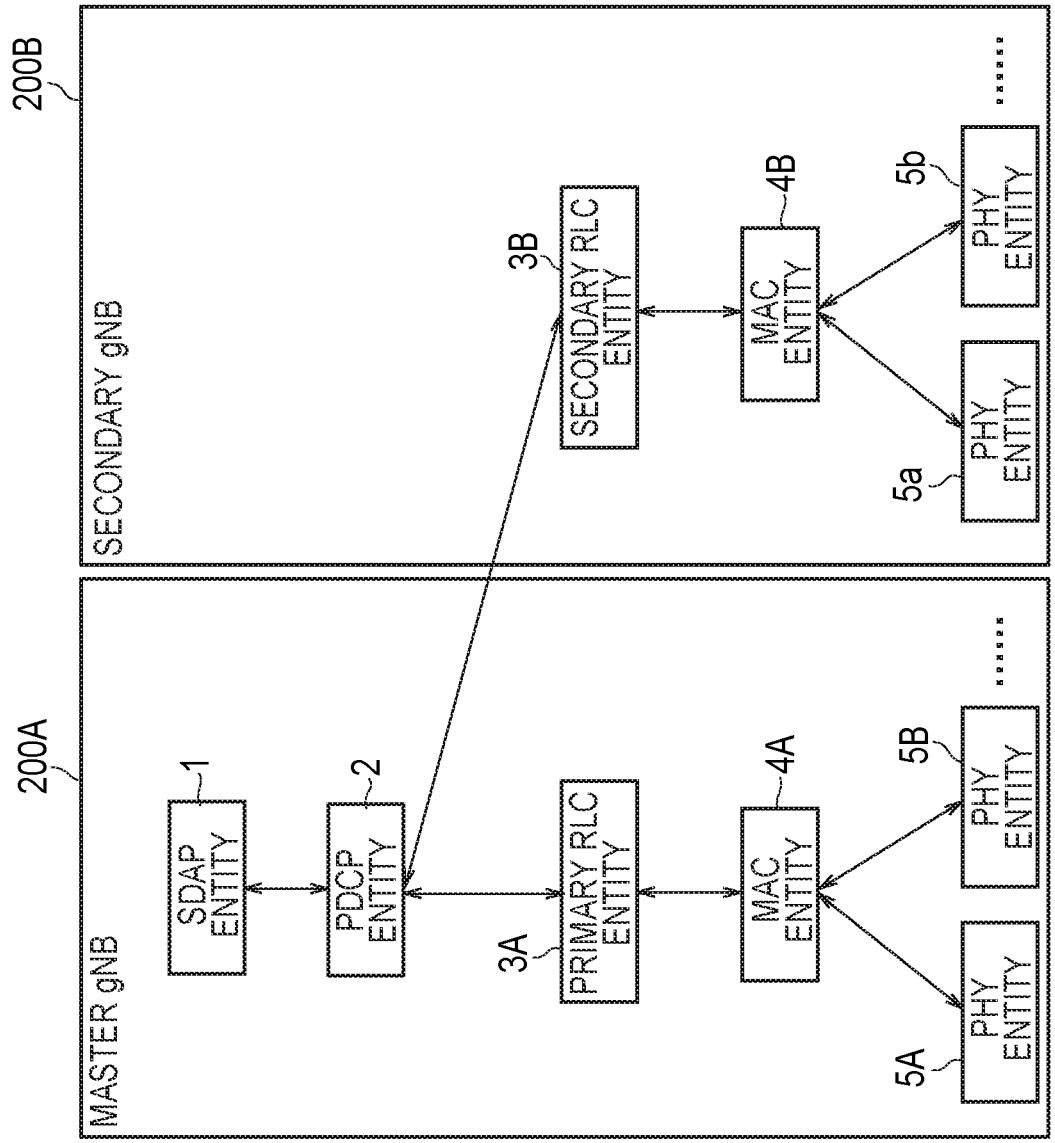
FIG. 7 is a diagram illustrating a second exemplary configuration of duplicate transmission according to an embodiment.

FIG. 7 is a diagram illustrating a second exemplary configuration of duplicate transmission. In the second example, duplicate transmission is applied in dual connectivity (DC).

As illustrated in FIG. 7, for DC, the PDCP entity 2 and the primary RLC entity 3A are provided in a master gNB 200A (a first base station), and the secondary RLC entity 3B is provided in a secondary gNB 200B (a second base station). In addition, a MAC entity 4A of the master gNB 200A and a MAC entity 4B of the secondary gNB 200B are respectively provided. The secondary gNB 200B is provided with a plurality of PHY entities 5a, 5b, . . . corresponding to a plurality of carriers (a plurality of cells). For DC, a MAC entity corresponding to the master gNB 200A and a MAC entity corresponding to the secondary gNB 200B are respectively provided in the UE 100 (not illustrated).

As described above, the duplicate transmission (packet duplication), in which the same PDCP packets are transmitted in duplicate through two independent transmission paths, can improve the reliability of communication. On the other hand, the duplicate transmission uses twice the amount of radio resources for transmission compared with when the duplicate transmission is not employed, and is thus susceptible to improvement in view of enhancing the use efficiency of radio resources.

In an embodiment, a method described below enhances the use efficiency of radio resources while improving the reliability of communication.

In a radio communication method according to an embodiment, the PDCP entity 2 corresponding to the PDCP layer generates a PDCP packet, and the primary RLC entity 3A transmits the PDCP packet. The primary RLC entity 3A retransmits the PDCP packet and the secondary RLC entity 3B transmits the PDCP packet, in response to unsuccessful transmission of the PDCP packet by the primary RLC entity 3A, to perform, by the primary RLC entity 3A and the secondary RLC entity 3B, duplicate transmission of the same PDCP packets. Such operation may be performed only when the duplicate transmission is configured and activated and performing this operation is configured by an RRC entity and the like.

Here, the primary RLC entity 3A transmits the PDCP packet to a receiving side via a transmission path corresponding to a first carrier (a first carrier wave). The secondary RLC entity 3B transmits the PDCP packet to the receiving side via a transmission path corresponding to a second carrier (a second carrier wave) different from the first carrier.

In this way, even when the duplicate transmission is activated, only the primary RLC entity 3A transmits the PDCP packet until the primary RLC entity 3A unsuccessfully transmits the PDCP packet at least once. In other words, the secondary RLC entity 3B does not transmit the PDCP packet while the primary RLC entity 3A successfully transmits the PDCP packet. As a result, the radio resources for transmission can be saved.

When the primary RLC entity 3A unsuccessfully transmits the PDCP packet at least once, the primary RLC entity 3A retransmits the PDCP packet, and the secondary RLC entity 3B transmits the same PDCP packet. In other words, at least one unsuccessful transmission of the PDCP packet by the primary RLC entity 3A triggers the duplicate transmission. As a result, the reliability of communication can be improved.

Therefore, such a radio communication method can enhance the use efficiency of radio resources while improving the reliability of communication.

(2) Exemplary Operation 1

Figure 8:
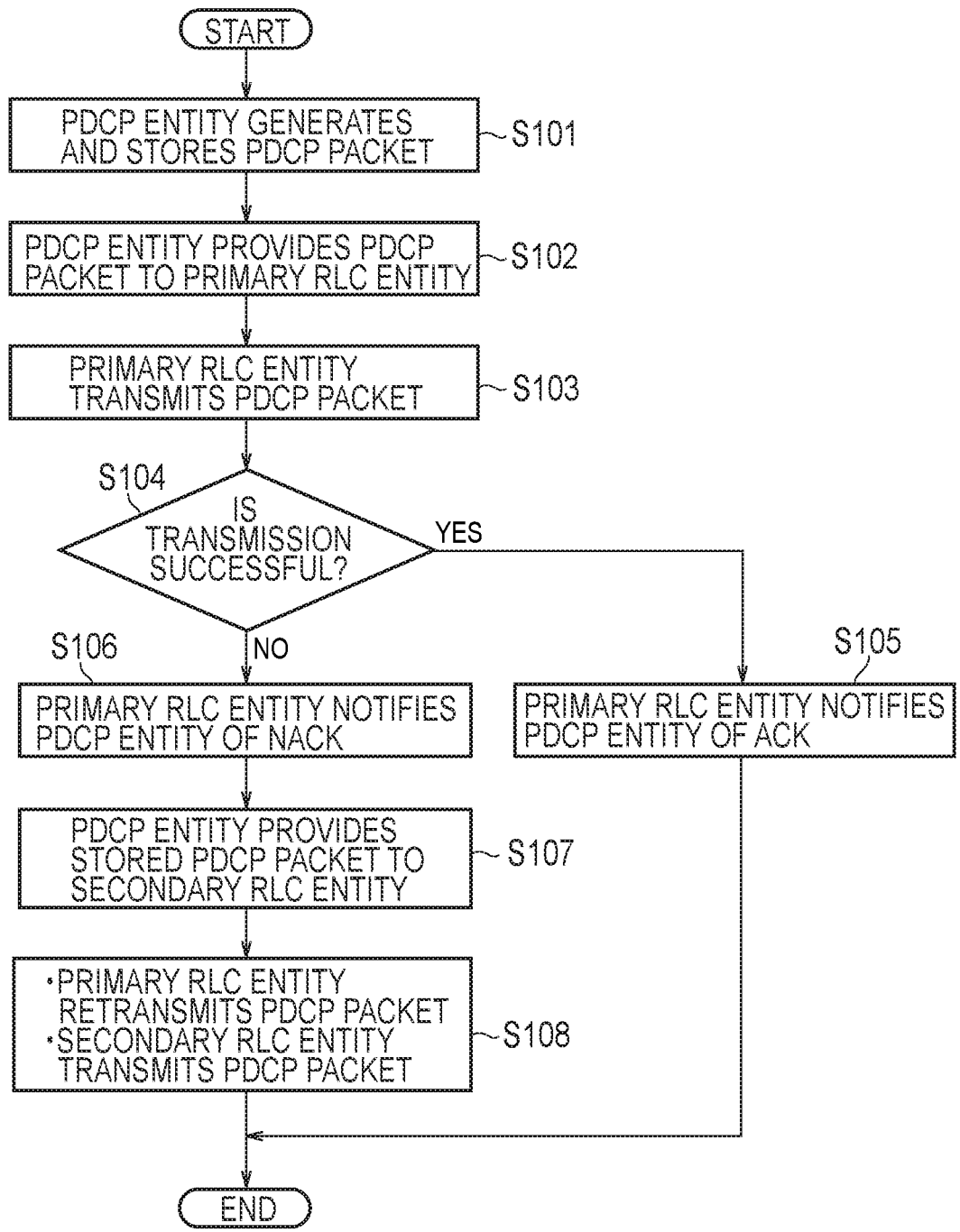
FIG. 8 is a diagram illustrating an exemplary operation 1 according to an embodiment.

FIG. 8 is a diagram illustrating an exemplary operation 1.

As illustrated in FIG. 8, the PDCP entity 2 generates a PDCP PDU (PDCP packet) and stores the generated PDCP PDU, in step S101.

In step S102, the PDCP entity 2 provides the PDCP PDU generated in step S101 to the primary RLC entity 3A. The primary RLC entity 3A receives the PDCP PDU as an RLC service data unit (SDU).

Here, even when the duplicate transmission is activated, the PDCP entity 2 provides the PDCP PDU only to the primary RLC entity 3A. In other words, even when the duplicate transmission is activated, the PDCP entity 2 provides the PDCP PDU to the primary RLC entity 3A and does not provide the PDCP PDU to the secondary RLC entity 3B.

In step S103, the primary RLC entity 3A transmits (initially transmits) the PDCP PDU provided by the PDCP entity 2. Specifically, the primary RLC entity 3A transmits the PDCP PDU by providing an RLC PDU corresponding to the PDCP PDU to the MAC entity 4 (the MAC entity 4A in FIG. 7).

In step S104, the primary RLC entity 3A confirms whether the PDCP PDU has been successfully transmitted in step S103 (that is, whether the PDCP PDU has been delivered to a receiving side). The successful transmission of the PDCP PDU means that the primary RLC entity 3A receives ACK information (positive acknowledge) on the RLC PDU corresponding to the PDCP PDU from the receiving side. On the other hand, the unsuccessful transmission of the PDCP PDU means that the primary RLC entity 3A receives NACK information (negative acknowledge) on the RLC PDU corresponding to the PDCP PDU from the receiving side, or that the primary RLC entity 3A does not receive ACK information on the RLC PDU corresponding to the PDCP PDU from the receiving side.

When the primary RLC entity 3A successfully transmits the PDCP PDU (step S104: YES), the primary RLC entity 3A notifies the PDCP entity 2 of the successful transmission of the PDCP PDU (ACK information) in step S105. The ACK information may include the sequence number of the PDCP PDU. The PDCP entity 2 discards the PDCP PDU stored in step S101 in response to the ACK information.

On the other hand, when the primary RLC entity 3A unsuccessfully transmits the PDCP PDU (step S104: NO), the primary RLC entity 3A notifies the PDCP entity 2 of the unsuccessful transmission of the PDCP PDU (NACK information) in step S106. The NACK information may include the sequence number of the PDCP PDU.

In step S107, the PDCP entity 2 provides the PDCP PDU stored in step S101 to the secondary RLC entity in response to the NACK information notified by the primary RLC entity 3A.

In step S108, the primary RLC entity 3A retransmits the PDCP PDU that has been unsuccessfully transmitted. The secondary RLC entity transmits (initially transmits) the PDCP PDU provided by the PDCP entity 2. Specifically, the secondary RLC entity 3B transmits the PDCP PDU by providing the RLC PDU corresponding to the PDCP PDU to the MAC entity 4 (the MAC entity 4B in FIG. 7).

Therefore, when the primary RLC entity 3A is unsuccessful in the initial transmission of the PDCP PDU (that is, when the primary RLC entity 3A retransmits the PDCP PDU), the secondary RLC entity 3B transmits the same PDCP PDU. In other words, from the point at which the primary RLC entity 3A retransmits the PDCP PDU, the duplicate transmission state is established.

In the exemplary operation 1, although the duplicate transmission is performed when the primary RLC entity 3A unsuccessfully transmits once, the operation is not limited to such a manner. The PDCP entity 2 or the primary RLC entity 3A counts the number of unsuccessful transmissions of the PDCP PDU by the primary RLC entity 3A, and when the counted number reaches a predetermined number (for example, three), the duplicate transmission may be performed. Instead of counting the total number of transmissions including initial transmissions and retransmissions, only the number of retransmissions may be counted.

When the primary RLC entity 3A makes a count, the NACK information is notified to the PDCP entity 2 by the primary RLC entity 3A when the number of unsuccessful transmissions reaches a predetermined number. The PDCP entity 2 provides the stored PDCP PDU to the secondary RLC entity 3B in response to the NACK information.

When the PDCP entity 2 makes a count, the PDCP entity 2 counts the number of receptions of the NACK information from the primary RLC entity 3A. The PDCP entity 2 provides the stored PDCP PDU to the secondary RLC entity 3B when the number of receptions of the NACK information reaches a predetermined number.

When the exemplary operation 1 is executed in the UE 100, the predetermined number may be configured in the UE 100 with an RRC message from the gNB 200. The RRC message may be a unicast message or a broadcast message.

Further, in the exemplary operation 1, after the primary RLC entity 3A and the secondary RLC entity 3B get into the duplicate transmission state, the following operation may be performed. Specifically, when the primary RLC entity 3A unsuccessfully retransmits the PDCP PDU and the secondary RLC entity 3B successfully transmits the PDCP PDU in the duplicate transmission, the next PDCP PDU may be transmitted by the secondary RLC entity 3B.

In other words, the initial transmission of the current PDCP PDU is performed by an RLC entity that has successfully transmitted the previous PDCP PDU between the primary RLC entity 3A and the secondary RLC entity 3B.

For example, when RLC retransmission occurs in the primary RLC entity 3A and the same packet is successfully transmitted by the secondary RLC entity 3B, the next packet is initially transmitted by the secondary RLC entity 3B, and the primary RLC entity 3A will start transmission of the same packet in response to unsuccessful transmission by the secondary RLC entity 3B. Such operation can be considered that the roles of the primary RLC entity 3A and the secondary RLC entity 3B are interchanged, or that the transmission path for initial transmission is simply changed.

(3) Exemplary Operation 2

Figure 9:
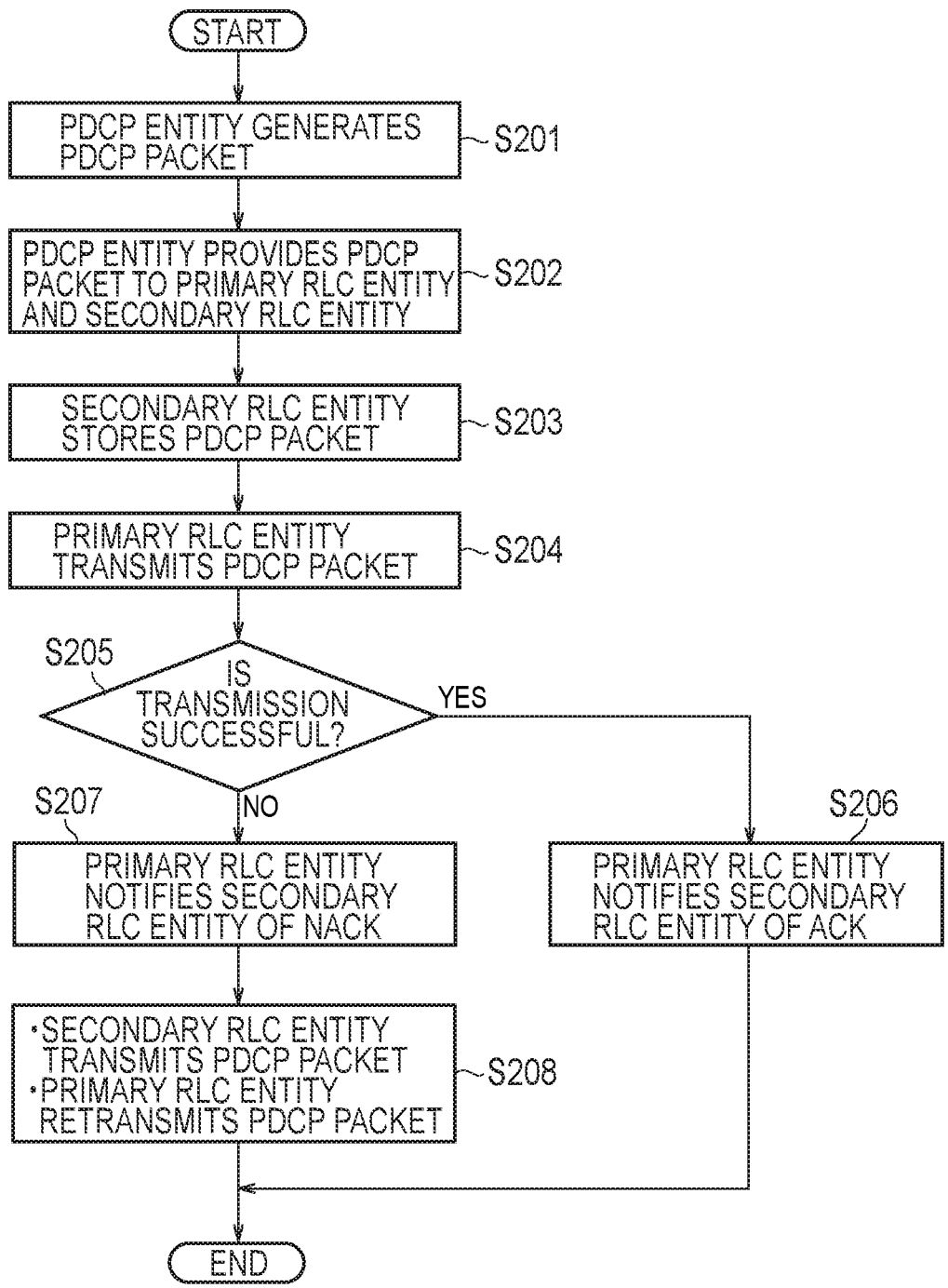
FIG. 9 is a diagram illustrating an exemplary operation 2 according to an embodiment.

FIG. 9 is a diagram illustrating an exemplary operation 2. The exemplary operation 2 will be mainly described about operation different from that of the exemplary operation 1.

As illustrated in FIG. 9, the PDCP entity 2 generates a PDCP PDU (PDCP packet) in step S201.

In step S202, the PDCP entity 2 provides the PDCP PDU generated in step S201 to both the primary RLC entity 3A and the secondary RLC entity 3B. The primary RLC entity 3A and the secondary RLC entity 3B receive the PDCP PDU as an RLC SDU.

In step S203, the secondary RLC entity 3B stores the PDCP PDU provided by the PDCP entity 2. Even when the duplicate transmission is activated, the secondary RLC entity 3B waits without transmitting the PDCP PDU.

In step S204, the primary RLC entity 3A transmits (initially transmits) the PDCP PDU provided by the PDCP entity 2. Specifically, the primary RLC entity 3A transmits the PDCP PDU by providing an RLC PDU corresponding to the PDCP PDU to the MAC entity 4 (the MAC entity 4A in FIG. 7).

In step S205, the primary RLC entity 3A confirms whether the PDCP PDU has been successfully transmitted in step S203 (that is, whether the PDCP PDU has been delivered to a receiving side).

When the primary RLC entity 3A successfully transmits the PDCP PDU (step S205: YES), the primary RLC entity 3A notifies the PDCP entity 2 and the secondary RLC entity 3B of the successful transmission of the PDCP PDU (ACK information) in step S206. The ACK information may include the sequence number of the PDCP PDU. The secondary RLC entity 3B discards the PDCP PDU stored in step S203 in response to the ACK information. Alternatively, the secondary RLC entity 3B may discard the PDCP PDU (RLC SDU) when a timer expires. Even when the primary RLC entity 3A does not notify the explicit ACK information, the secondary RLC entity 3B may discard the PDCP PDU (RLC SDU) when the timer expires. The timer may be started when the secondary RLC entity 3B receives the PDCP PDU.

On the other hand, when the primary RLC entity 3A unsuccessfully transmits the PDCP PDU (step S205: NO), the primary RLC entity 3A notifies the secondary RLC entity 3B (and the PDCP entity 2) of the unsuccessful transmission of the PDCP PDU (NACK information) in step S207. The NACK information may include the sequence number of the PDCP PDU.

In step S208, the primary RLC entity 3A retransmits the PDCP PDU that has been unsuccessfully transmitted. The secondary RLC entity transmits (initially transmits) the PDCP PDU stored in step S203 in response to the NACK information notified by the primary RLC entity 3A. Therefore, when the primary RLC entity 3A is unsuccessful in the initial transmission of the PDCP PDU (that is, when the primary RLC entity 3A retransmits the PDCP PDU), the secondary RLC entity 3B transmits the same PDCP PDU. In other words, from the point at which the primary RLC entity 3A retransmits the PDCP PDU, the duplicate transmission state is established.

In the exemplary operation 2, although the duplicate transmission is performed when the primary RLC entity 3A unsuccessfully transmits once, the operation is not limited to such a manner. The primary RLC entity 3A or the secondary RLC entity 3B counts the number of unsuccessful transmissions of the PDCP PDU by the primary RLC entity 3A, and when the counted number reaches a predetermined number (for example, three), the duplicate transmission may be performed. Instead of counting the total number of transmissions including initial transmissions and retransmissions, only the number of retransmissions may be counted.

When the primary RLC entity 3A makes a count, the NACK information is notified to the secondary RLC entity 3B by the primary RLC entity 3A when the number of unsuccessful transmissions reaches a predetermined number.

When the secondary RLC entity 3B makes a count, the secondary RLC entity 3B counts the number of receptions of the NACK information from the primary RLC entity 3A. The secondary RLC entity 3B transmits the stored PDCP PDU when the number of receptions of the NACK information reaches a predetermined number.

When the exemplary operation 2 is executed in the UE 100, the predetermined number may be configured in the UE 100 with an RRC message from the gNB 200. The RRC message may be a unicast message or a broadcast message.

Further, in the exemplary operation 2, after the primary RLC entity 3A and the secondary RLC entity 3B get into the duplicate transmission state, the following operation may be performed. Specifically, when the primary RLC entity 3A unsuccessfully retransmits the PDCP PDU and the secondary RLC entity 3B successfully transmits the PDCP PDU in the duplicate transmission, the next PDCP PDU may be transmitted by the secondary RLC entity 3B. In other words, the initial transmission of the current PDCP PDU is performed by an RLC entity that has successfully transmitted the previous PDCP PDU between the primary RLC entity 3A and the secondary RLC entity 3B.

Another Embodiment

In the above embodiments, an example in which the first transmission entity is the primary RLC entity 3A and the second transmission entity is the secondary RLC entity 3B is mainly described. However, as illustrated in FIG. 10, for transmission in triplicate or more, any two of three or more RLC entities 3A, 3B, 3C, . . . may be used as the first and second transmission entities, or RLC entities used as the first transmission entity and/or the second transmission entity may be switched as appropriate.

The operation according to the above embodiments may be applied only to a plurality of secondary RLC entities 3B, 3C, . . . . In such a configuration, the first secondary RLC entity 3B corresponds to the first transmission entity and the second secondary RLC entity 3C corresponds to the second transmission entity.

Figure 10:
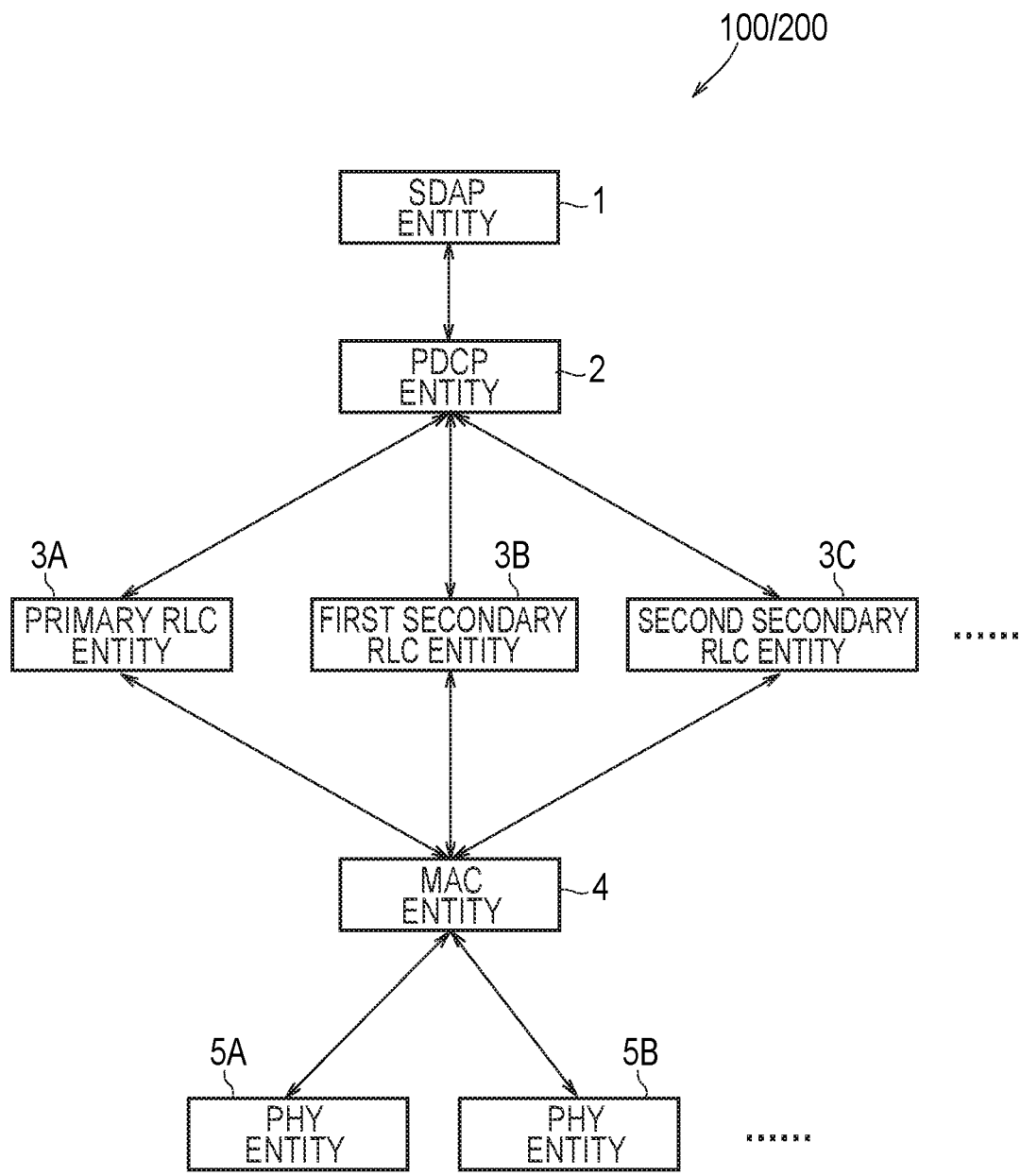
FIG. 10 is a diagram illustrating an exemplary configuration according to another embodiment.

Further, as illustrated in FIG. 10, for the transmission in triplicate or more, the primary RLC entity 3A and the first secondary RLC entity 3B may always perform duplicate transmission. In response to the status of ACK information/NACK information in the duplicate transmission, the second secondary RLC entity 3C may perform duplicate transmission.

For example, for the duplicate transmission by the primary RLC entity 3A and the first secondary RLC entity 3B, when both the primary RLC entity 3A and the first secondary RLC entity 3B are unsuccessful in transmission (NACK information is received), the primary RLC entity 3A and the first secondary RLC entity 3B retransmit the packet, and the second secondary RLC entity 3C transmits the same packet. In such a configuration, the primary RLC entity 3A or the first secondary RLC entity 3B corresponds to the first transmission entity, and the second secondary RLC entity 3C corresponds to the second transmission entity.

Alternatively, the first and second transmission entities may be entities of a layer different from the RLC layer. For example, the first transmission entity may be a first MAC entity, and the second transmission entity may be a second MAC entity. The first transmission entity may be a first MAC sub-entity in a MAC entity, and the second transmission entity may be a second MAC sub-entity in the same MAC entity.

In such a configuration, an MAC SDU may be stored in the multiplexing process for generating an MAC PDU from the MAC SDU, the first MAC (sub-) entity may perform transmission, and when the first MAC (sub-) entity is unsuccessful in the transmission (that is, HARQ NACK information is returned), the second MAC (sub-) entity may transmit the stored MAC SDU.

Alternatively, the first transmission entity may be a first PHY entity, and the second transmission entity may be a second PHY entity. A cell corresponding to the first PHY entity may be regarded as being active and a cell corresponding to the second PHY entity as being inactive, the first PHY entity may perform transmission, and when the first PHY entity is unsuccessful in the transmission, the second PHY entity may perform transmission.

A program that causes a computer to execute each process executed by the UE 100 and the gNB 200 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example.

The circuit which executes each process performed by the UE100 or the gNB 200 are integrated, and at least part of the UE 100 or the gNB 200 may be configured as a semiconductor integrated circuit (a chip set, SoC).

Although the embodiments have been described in detail with reference to the drawings, the specific configuration is not limited to the above, and various design changes and the like can be made without departing from the gist.

The invention claimed is:

1. A radio communication method used in a mobile communication system, the method comprising:
   generating, by a PDCP entity corresponding to a PDCP layer, a packet;
   transmitting, by a first transmission entity, the packet; and
   based on unsuccessful transmission of the packet by the first transmission entity, performing duplicate transmission of the packet, including:
      retransmitting, by the first transmission entity, the packet, and
      transmitting, by a second transmission entity different from the first transmission entity, the packet;
   wherein each of the first transmission entity and the second transmission entity corresponds to a layer lower than the PDCP layer.

2. The radio communication method according to claim 1, wherein
   the first transmission entity is configured to transmit the packet to a receiving side via a transmission path corresponding to a first carrier, and
   the second transmission entity is configured to transmit the packet to the receiving side via a transmission path corresponding to a second carrier different from the first carrier.

3. The radio communication method according to claim 1, wherein
   the layer lower than the PDCP layer that corresponds to each of the first transmission entity and the second transmission entity is an RLC layer.

4. The radio communication method according to claim 1, further comprising:
   storing, by the PDCP entity, the generated packet; and
   providing, by the PDCP entity, the stored packet to the second transmission entity in response to the unsuccessful transmission of the packet by the first transmission entity, wherein
   in the performing duplicate transmission, the second transmission entity transmits the packet provided by the PDCP entity.

5. The radio communication method according to claim 4, further comprising:
   notifying, by the first transmission entity, the PDCP entity of NACK information including a sequence number of the packet which has been unsuccessfully transmitted.

6. The radio communication method according to claim 1, further comprising:
   providing, by the PDCP entity, the generated packet to both the first transmission entity and the second transmission entity; and
   storing, by the second transmission entity, the generated packet provided by the PDCP entity, wherein
   in the performing duplicate transmission, the second transmission entity is configured to transmit the stored packet in response to the unsuccessful transmission of the packet by the first transmission entity.

7. The radio communication method according to claim 6, further comprising:
   notifying, by the first transmission entity, the second transmission entity of NACK information including a sequence number of the packet that has been unsuccessfully transmitted.

8. The radio communication method according to claim 6, further comprising:
   notifying, by the first transmission entity, the second transmission entity of ACK information including a sequence number of the packet that has been successfully transmitted; and
   discarding, by the second transmission entity, the stored packet in response to the notification of the ACK information.

9. The radio communication method according to claim 6, further comprising:
   starting a timer when the second transmission entity stores the packet; and
   discarding, by the second transmission entity, the stored packet in response to expiration of the timer.

10. The radio communication method according to claim 1, further comprising:
    counting, by the first transmission entity, a number of unsuccessful transmissions of the packet, wherein
    the performing duplicate transmission is performed when the number reaches a predetermined number.

11. The radio communication method according to claim 1, further comprising:
    transmitting, by the second transmission entity, a next packet, when, in the performing duplicate transmission, the first transmission entity unsuccessfully retransmits the packet, and the second transmission entity successfully transmits the packet.

12. The radio communication method according to claim 1, wherein the PDCP entity and the first transmission entity and the second transmission entity are provided in one user apparatus.

13. The radio communication method according to claim 1, wherein
the PDCP entity and the first transmission entity and the second transmission entity are provided in one base station.

14. The radio communication method according to claim 1, wherein
the PDCP entity and the first transmission entity are provided in a first base station, and the second transmission entity is provided in a second base station different from the first base station.

15. An apparatus used in a mobile communication system, the apparatus comprising:
a PDCP entity corresponding to a PDCP layer and configured to generate a packet;
a first transmission entity configured to transmit the packet; and
a second transmission entity different from the first transmission entity, wherein
wherein each of the first transmission entity and the second transmission entity corresponds to a layer lower than the PDCP layer, and
based on unsuccessful transmission of the packet by the first transmission entity, the first transmission entity is configured to retransmit the packet, and the second transmission entity is configured to transmit the packet to perform duplicate transmission of the same packet by the first transmission entity and the second transmission entity.

* * * * *